Nov. 17, 1959   H. STOLZ ET AL   2,912,732
WIRE HOOK CONNECTING CONVEYER BANDS, BELTS, AND THE LIKE
Filed Dec. 9, 1954   3 Sheets-Sheet 1

Inventors
HEINRICH STOLZ
HERMANN STOLZ
By Frederick E. Hane
ATTORNEY

Inventors
HEINRICH STOLZ
HERMANN STOLZ
ATTORNEY

Nov. 17, 1959 H. STOLZ ET AL 2,912,732
WIRE HOOK CONNECTING CONVEYER BANDS, BELTS, AND THE LIKE
Filed Dec. 9, 1954 3 Sheets-Sheet 3

Inventors
HEINRICH STOLZ
HERMANN STOLZ
By
ATTORNEY

United States Patent Office 2,912,732
Patented Nov. 17, 1959

2,912,732

WIRE HOOK CONNECTING CONVEYER BANDS, BELTS, AND THE LIKE

Heinrich Stolz, Muhlheim (Main), Dieteshein, and Hermann Stolz, Muhlheim (Main), Germany, assignors to Curt Matthaei, Offenbach (Main), Germany, a firm Application December 9, 1954, Serial No. 474,249

Claims priority, application Netherlands June 1, 1954

2 Claims. (Cl. 24—33)

This invention relates to V-shaped wire staples for connecting parts of conveyer bands, belts or the like.

Various constructions of staples for the above purpose are already known. According to one known construction, an apertured guide surface is provided on the wire staple on the side thereof opposite to the point. In the application of staples of this type, the points thereof are passed through the apertures and are then bent over. The provision of these guide surfaces is troublesome and expensive. Moreover, the staples are not reliable in use.

It has further been proposed in connection with single limb staples to provide one limb only with the point and to form the other limb as an eyelet. This, however, materially complicates and increases the cost of production of the staples which are also not reliable in use.

Finally, it is already known to provide staples with double limbs forming an eyelet at the crown portion, said double limbs being close to each other and forming a common point. The point of the staple comprising the two halves is pressed through the band and after being passed through the crown eyelet is then bent over. This known staple involves less difficulties in manufacture than the constructions herein before mentioned. In use, however, for connecting parts of conveyer bands considerable disadvantages arise. Thus, for example, the total diameter of the two limbs must be made greater than the normal wire thickness of single limb staples of about 2 mm., because otherwise the two halves of the staple points become detached. This increase in diameter results, however, in considerably larger holes being made in the band; consequently, a correspondingly higher strain is placed on the texture of the band and more rapid wear takes place because, as shown by experience, the points of the band penetrated by the staples form the weakest parts of the conveyer band connections. Moreover, greater force is required to press the staples into the band owing to the large total diameter of the individual staples, assuming the usual pressing spacing is maintained. Finally, the retention of the pressing in spacing involves a higher expenditure of material with the same number of staples and moreover there is a necessity to adopt special constructions for the combs of the pressing device.

It is therefore an object of this invention to provide a conveyer band connection which may be produced by the usual mode of operation without extensive alteration of the pressing tools or consumption of material.

According to this invention, means for connecting parts of conveyer bands, belts or the like comprises a substantially V-shaped staple, one end of one limb thereof being pointed and the end of the other limb being laterally diverted to form a hook-like part.

In applying the invention to V-shaped wire staples having double limbs, the two limbs of each wire staple are separated by a distance corresponding to the spacing at which the staples are intended to be pressed into the parts to be joined.

The application of the staples is preferably effected in two stages, in the first of which the staple points are completely pressed through the band and in the second of which the staple points projecting from the band are bent over the laterally diverted parts of the staples.

An apparatus according to the invention for carrying out this method comprises a pressing tool, the jaws of which are provided with cavities for receiving the staple points.

The wire staples may, as is customary with the usual V-shaped individual staples, either be mounted in a row on a card strip or may be connected together by a wire in order to form strips of wire staples as required in the connection of the band parts.

In the accompanying drawings.

Figure 1:
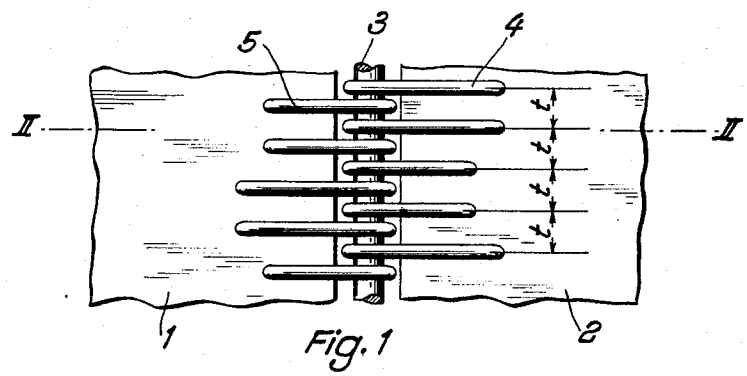
Fig. 1 is a plan view of parts of conveyer bands connected by staples according to the invention.
Figure 2:
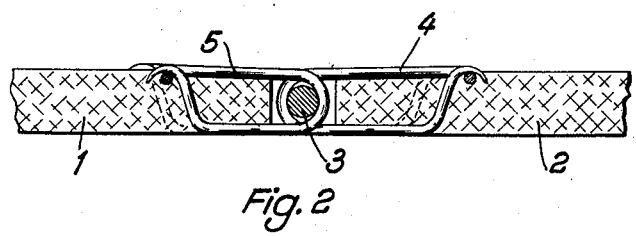
Fig. 2 is a sectional elevation on the line II—II, of Fig. 1.
Figure 3:
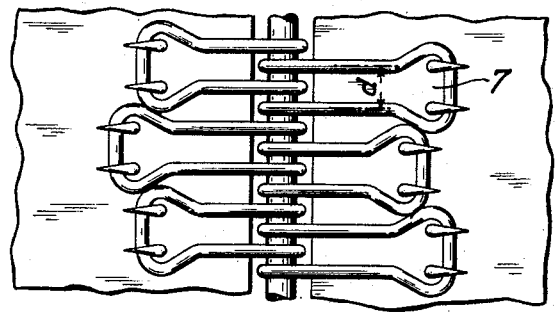
Fig. 3 is a plan view of the underside of Fig. 1.

According to Figs. 1–3, two band ends 1 and 2 are connected together by wire staples 4, 5, a coupling pin 3 passing through the alternately arranged loops connecting the limbs of the staples.

Figure 4:
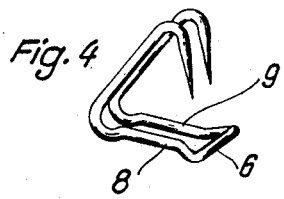
Fig. 4 is a perspective view of a double limb staple according to this invention.
Figure 5:
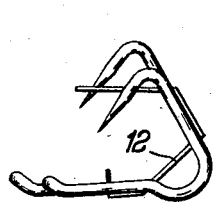
Figs. 5 and 6 are respectively an end view and a plan view of a row of wire staples on cards.
Figure 6:
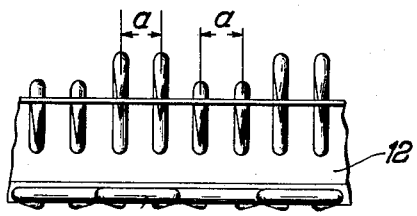

According to Fig. 4 the individual V-shaped wire staples are constructed as double staples, the lateral portion 6 connecting the limbs forming an eye 7. The two V-shaped wire limbs 8 and 9 of each wire staple 4 or 5 are spaced apart by a distance $a$ corresponding to the pressing in distance, and one of such V-shaped wire limbs is longer than the other.

Figure 7:
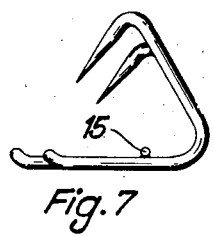
Figs. 7 and 8 are respectively an end view and a plan view of a row of wire staples employing a connecting wire.
Figure 8:
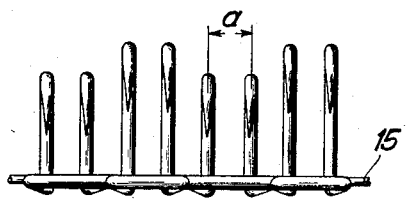

The individual staples 4 or 5 are either provided in a row in the usual manner on a paper strip 12 or are connected together by a cross wire 15 by means of spot welding or the like according to Figs. 7 and 8.

Figure 9:
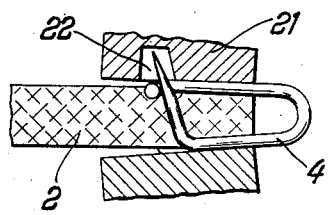
Figs. 9 and 10 are diagrammatic views illustrating the pressing in of the staples.
Figure 10:
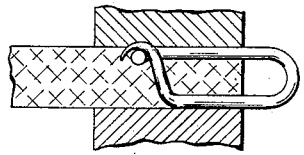

The staple pressing operation is preferably effected in two stages as illustrated in Figs. 9 and 10.

In the first stage, Fig. 9, the staple points are completely pressed through the band whilst in the second stage, Fig. 10, the projecting points of the staples are bent over the edge of the lateral portion 6.

The usual pressing tools may be employed for this pressing operation. It is merely necessary to provide corresponding apertures 22 in one of the pressing jaws, for example in the upper pressing jaw 21. By suitably forming the preferably ground points of the staples the pressing operation may be effected in one step, whereby the staple points are bent round the staple eyes during the pressing operation itself.

Figure 12:
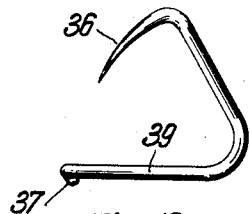
Figs. 12 and 13 are respectively an end view and a plan view of a strip of wire staples according to Fig. 11
Figure 13:
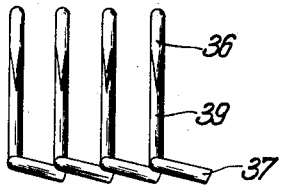
Figure 14:
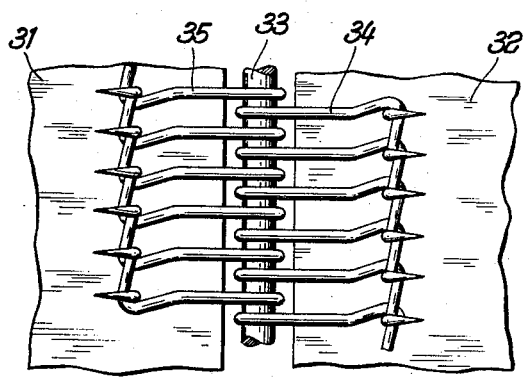
Fig. 14 is a view similar to Fig. 3 but employing wire staples according to Fig. 11.

In the construction according to Figs. 11–14 the conveyer band connection comprises the two band ends 31 and 32 and a coupling pin 33 which passes through the alternately arranged loops of the wire staples 34, 35 (Fig. 14).

Figure 11:
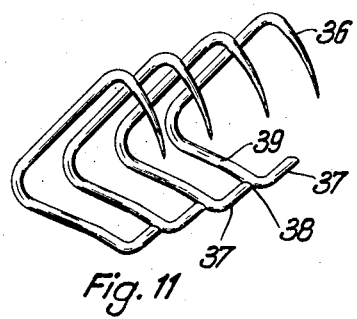
Fig. 11 is a perspective view of another modification of V-shaped wire staples according to this invention.

According to Figs. 11–13, single limb, V-shaped wire staples are formed with laterally bent ends opposite the staple points 36. The bent end of each staple 37 is welded at 38 to the adjacent limb 39 of the next staple.

The staples 37 consequently form a kind of undulated rod from which the staple limbs 39 emerge in parallel formation. After the staple points 36 have been pressed through the band, they are caused to engage the hooks 37 in the same manner as with the construction according to Figs. 1–8.

What we claim is:

1. A double wire hook for connecting two ends of a conveyer band, comprising two wires of generally V-shape, a cross wire bridging two juxtaposed ends of said wires in spaced apart relationship, free ends of said wires being extended, pointed and angled off toward the said cross wire, and the said pointed ends being of a length sufficient to penetrate the conveyer band and to be clenched over the said cross wire thereby to form a double hook having each of its spaced apart wires completely closed and interlocked in itself.

2. A double wire hook as set forth in claim 1, in which one of the V-wire limbs is of greater length than the other.

References Cited in the file of this patent

UNITED STATES PATENTS

| | | |
|---|---|---|
| 729,302 | Erickson | May 26, 1903 |
| 982,374 | Linderman | Jan. 24, 1911 |
| 1,015,783 | Conn | Jan. 30, 1912 |
| 1,163,780 | Schneider | Dec. 14, 1915 |
| 1,257,061 | Yetton et al. | Feb. 19, 1918 |
| 1,768,935 | Schnelle | July 1, 1930 |
| 1,804,396 | Brogan | May 12, 1931 |
| 1,868,100 | Goodstein | July 19, 1932 |
| 2,224,532 | Ziller | Dec. 10, 1940 |
| 2,392,159 | La Place | Jan. 1, 1946 |

FOREIGN PATENTS

| | | |
|---|---|---|
| 311,268 | Germany | Mar. 13, 1919 |
| 484,070 | Great Britain | Apr. 29, 1938 |
| 516,937 | Belgium | Jan. 31, 1953 |
| 758,014 | Germany | Jan. 19, 1953 |